United States Patent
Nakada

(10) Patent No.: US 11,349,571 B2
(45) Date of Patent: May 31, 2022

(54) OPTICAL TRANSPONDER

(71) Applicant: NEC Corporation, Tokyo (JP)

(72) Inventor: Tatsuhiro Nakada, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/043,364

(22) PCT Filed: Mar. 20, 2019

(86) PCT No.: PCT/JP2019/011630
§ 371 (c)(1),
(2) Date: Sep. 29, 2020

(87) PCT Pub. No.: WO2019/188635
PCT Pub. Date: Oct. 3, 2019

(65) Prior Publication Data
US 2021/0021347 A1    Jan. 21, 2021

(30) Foreign Application Priority Data

Mar. 30, 2018 (JP) .............................. JP2018-066355

(51) Int. Cl.
| | |
|---|---|
| *H04B 10/00* | (2013.01) |
| *H04B 10/40* | (2013.01) |
| *H04B 10/50* | (2013.01) |
| *H04B 10/60* | (2013.01) |
| *H04J 14/02* | (2006.01) |
| *H04J 14/00* | (2006.01) |

(52) U.S. Cl.
CPC ........... *H04B 10/40* (2013.01); *H04B 10/506* (2013.01); *H04B 10/60* (2013.01); *H04J 14/0212* (2013.01); *H04J 14/0258* (2013.01)

(58) Field of Classification Search
CPC .............................................. H04Q 2011/0077
See application file for complete search history.

(56) References Cited

U.S. PATENT DOCUMENTS

2001/0002863 A1* 6/2001 Yoshiyama ......... H04J 14/0249
398/79

FOREIGN PATENT DOCUMENTS

| JP | 2005-218138 A | 8/2005 |
|---|---|---|
| JP | 2006-080975 A | 3/2006 |
| JP | 2013-187632 A | 9/2013 |
| JP | 2016-103760 A | 6/2016 |
| JP | 2016-131274 A | 7/2016 |
| WO | 2015/045303 A1 | 4/2015 |

OTHER PUBLICATIONS

International Search Report of PCT/JP2019/011630 dated May 28, 2019 [PCT/ISA/210].
Written Opinion of PCT/JP2019/011630 dated May 28, 2019 [PCT/ISA/210].

* cited by examiner

*Primary Examiner* — Daniel G Dobson

(57) ABSTRACT

An optical transmitter includes: a plurality of client ports configured to receive a client signal from an end user device; a plurality of line ports configured to generate a line signal in which the client signal is stored, and transmit the line signal to an optical receiver; a switch configured to connect the plurality of client ports with the plurality of line ports; and a label provider configured to provide the client signal with a label for identifying a transmission destination in the optical receiver.

18 Claims, 9 Drawing Sheets

OPTICAL TRANSPONDER

CROSS REFERENCE TO RELATED APPLICATIONS

This application is a National Stage of International Application No. PCT/JP2019/011630 filed on Mar. 20, 2019, claiming priority based on Japanese Patent Application No. 2018-066355 filed Mar. 30, 2018, the disclosure of which is incorporated herein in its entirely by reference.

TECHNICAL FIELD

The present invention relates to an optical transmission system, and particularly relates to an optical transmitter, an optical receiver, and an optical transponder that are used in a terminal station of an optical transmission system.

BACKGROUND ART

An optical transceiver included in a terminal station used in an optical submarine cable system has a function of processing a client signal to be input, and outputting a line signal. The client signal is a signal to be transmitted and received between an end user device and the terminal station. The line signal is a signal for transmitting and receiving the client signal to and from another terminal station via a submarine transmission path. PTL 1 describes a configuration of an optical transceiver included in a terminal station.

FIG. 9 is a diagram illustrating a configuration example of an optical transceiver (optical transponder, hereinafter, referred to as a "transponder") included in a general terminal station. A transponder 900 includes a client port 901, a cross connect unit 902, and a line port 903. The terminal station transmits and receives a client signal to and from the end user device via the client port 901. The terminal station transmits and receives a line signal to and from another terminal station connected with a submarine transmission path via the line port 903. The cross connect unit 902 is a cross connect switch for connecting the client port 901 with the line port 903.

In association with the present invention, further, PTL 2 describes a technique relating to a correspondence between each channel before and after multiplexing, and each channel after demultiplexing in a multiplexing transmission system. PTL 3 describes a technique for outputting a signal separated from a time-division multiplex signal with a desired channel arrangement.

CITATION LIST

Patent Literature

[PTL 1] International Publication No. WO2015/045303
[PTL 2] Japanese Unexamined Patent Application Publication No. 2005-218138
[PTL 3] Japanese Unexamined Patent Application Publication No. 2006-080975

SUMMARY OF INVENTION

Technical Problem

In a general optical transmission system for connecting terminal stations, by registering cross-connect information common to an station and an opposite station, a client signal is communicated between an end user device connected to the station, and an end user device connected to the opposite station. In such a configuration, a system administrator needs to constantly administer cumbersome cross-connect information of each terminal station in addition to use information of each port. For example, when a port for outputting a signal is changed by changing a specification of the system, it is necessary to update port information of an input port on a reception side according to a change in port information of an output port on a transmission side. Therefore, there is a problem that administration becomes cumbersome to the system administrator.

(Object of Invention)

The present invention provides an optical transmitter, an optical receiver, and an optical transponder that facilitate port administration for inputting and outputting a client signal.

Solution to Problem

An optical transmitter according to the present invention includes:
a plurality of client ports for receiving a client signal from an end user device;
a plurality of line ports for generating a line signal in which the client signal is stored, and transmitting the line signal to an optical receiver;
a switch for connecting the plurality of client ports with the plurality of line ports; and
a label providing means for providing the client signal with a label for identifying a transmission destination in the optical receiver.

An optical receiver according to the present invention includes:
a plurality of line ports for receiving a line signal in which a client signal is stored from an optical transmitter, and outputting the client signal;
a label terminating means for extracting, from a label included in the client signal, information for identifying a transmission destination of the client signal;
a switch for connecting any one of the plurality of client ports with any one of the plurality of line ports that receives the line signal, based on information for identifying a transmission destination of the client signal; and
a plurality of client ports for transmitting the client signal to an end user device.

An optical transponder according to the present invention includes:
a plurality of client ports for transmitting and receiving a client signal between an end user device and the optical transponder;
a plurality of line ports for transmitting and receiving a line signal in which the client signal is stored to and from a communication device;
a label providing means for providing the client signal to be transmitted from the end user device to the communication device, with a first label for identifying a transmission destination in the communication device;
a label terminating means for extracting, from a second label included in the client signal received from the communication device, information for identifying a transmission destination of the client signal stored in the line signal received from the communication device; and
a switch for connecting any one of the plurality of client ports with any one of the plurality of line ports that receives the line signal, based on information for identifying a transmission destination of the client signal.

An optical transmission method according to the present invention includes:

receiving a client signal from an end user device at a plurality of client ports;

transmitting a line signal in which the client signal is stored to an optical receiver at a plurality of line ports;

connecting the plurality of client ports with the plurality of line ports; and providing the client signal to be transferred from any one of the plurality of client ports to any one of the plurality of line ports, with a label for identifying a transmission destination in the optical receiver.

An optical reception method according to the present invention includes:

transmitting a client signal to an end user device at a plurality of client ports;

receiving a line signal in which the client signal from an optical transmitter is stored at a plurality of line ports;

extracting, from a label included in the client signal, information for identifying a transmission destination of the client signal; and connecting any one of the plurality of client ports with any one of the plurality of line ports that receives the line signal, based on information for identifying a transmission destination of the client signal.

Advantageous Effects of Invention

An optical transmitter, an optical receiver, and an optical transponder according to the present invention facilitate port administration for inputting and outputting a client signal.

EXAMPLE EMBODIMENT

First Example Embodiment

Figure 1:
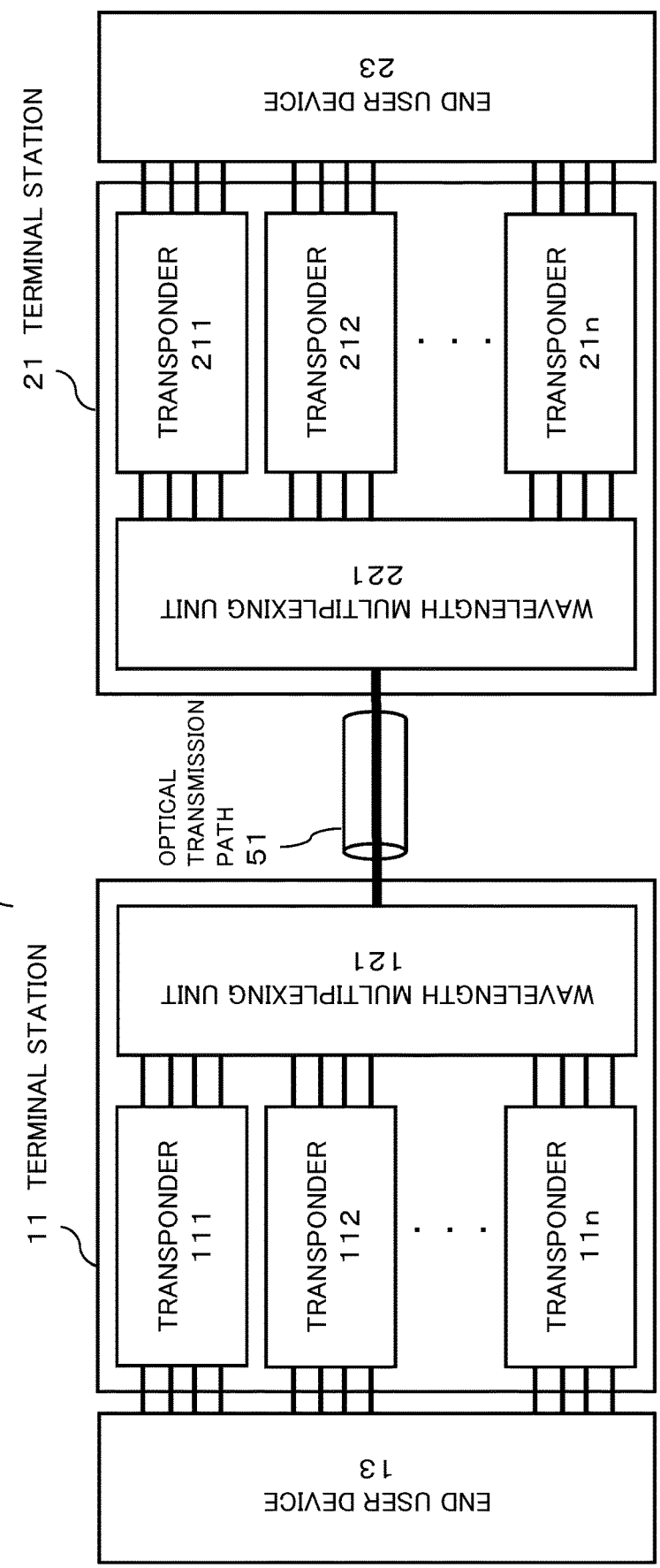
FIG. 1 is a diagram illustrating a configuration example of an optical transmission system 1 according to a first example embodiment.

FIG. 1 is a diagram illustrating a configuration example of an optical transmission system 1 according to a first example embodiment of the present invention. The optical transmission system 1 includes terminal stations 11 and 21, end user devices 13 and 23, and an optical transmission path 51. A client signal is bidirectionally transmitted between the end user device 13 and the end user device 23 via the terminal stations 11 and 21, and the optical transmission path 51.

The end user devices 13 and 23 are communication devices of a user of the optical transmission system 1, and, for example, general transmission devices or servers. The end user devices 13 and 23 transmit and receive, to and from the terminal station 11 or 21, a client signal to be transmitted to and from a communication destination.

The terminal station 11 includes n transponders 111 to 11$n$(n is a natural number). The terminal station 11 converts a client signal transmitted by the end user device 13 into a line signal, and outputs the line signal to a wavelength multiplexing unit 121. The line signal is an optical signal to be transmitted between the terminal station 11 and the terminal station 21, and in which the client signal is stored. The wavelength multiplexing unit 121 wavelength-multiplexes line signals input from the transponders 111 to 11$n$ and having different wavelengths, and outputs a wavelength-multiplexed signal to the optical transmission path 51 as a wavelength division multiplexing (WDM) signal. Further, the terminal station 11 wavelength-demultiplexes a WDM signal received from the terminal station 21 in the wavelength multiplexing unit 121, and outputs demultiplexed line signals to the transponders 111 to 11$n$ as line signals. The transponders 111 to 11$n$ convert the line signals into client signals, and outputs the client signals transmitted by the end user device 23 to the end user device 13.

The terminal station 21 has a configuration and a function similar to those of the terminal station 11. Specifically, the terminal station 21 includes n transponders 211 to 21$n$ (n is a natural number). The terminal station 21 converts a client signal transmitted by the end user device 23 into a line signal, and outputs the line signal to a wavelength multiplexing unit 221. The wavelength multiplexing unit 221 wavelength-multiplexes line signals input from the transponders 211 to 21$n$, and outputs a wavelength-multiplexed line signal to the optical transmission path 51 as a WDM signal. Further, the terminal station 21 wavelength-demultiplexes a WDM signal received from the terminal station 11 in the wavelength multiplexing unit 221, and outputs demultiplexed line signals to the transponders 211 to 21$n$. The transponders 211 to 21$n$ convert the line signals into electric signals, and output client signals transmitted by the end user device 13 to the end user device 23. In this way, both of the wavelength multiplexing units 121 and 221 play a role of a wavelength multiplexing/demultiplexing means having a wavelength multiplexing function and a wavelength demultiplexing function.

The optical transmission system 1 is applicable not only to a land optical transmission system but also to a submarine optical transmission system. For example, the optical transmission path 51 is a submarine transmission path, and the terminal stations 11 and 21 installed on a land terminate the submarine transmission path. The optical transmission path 51 may also include an optical amplifier, an optical repeater, and an optical add/drop multiplexer (OADM), regardless of an installation configuration thereof.

Figure 2:
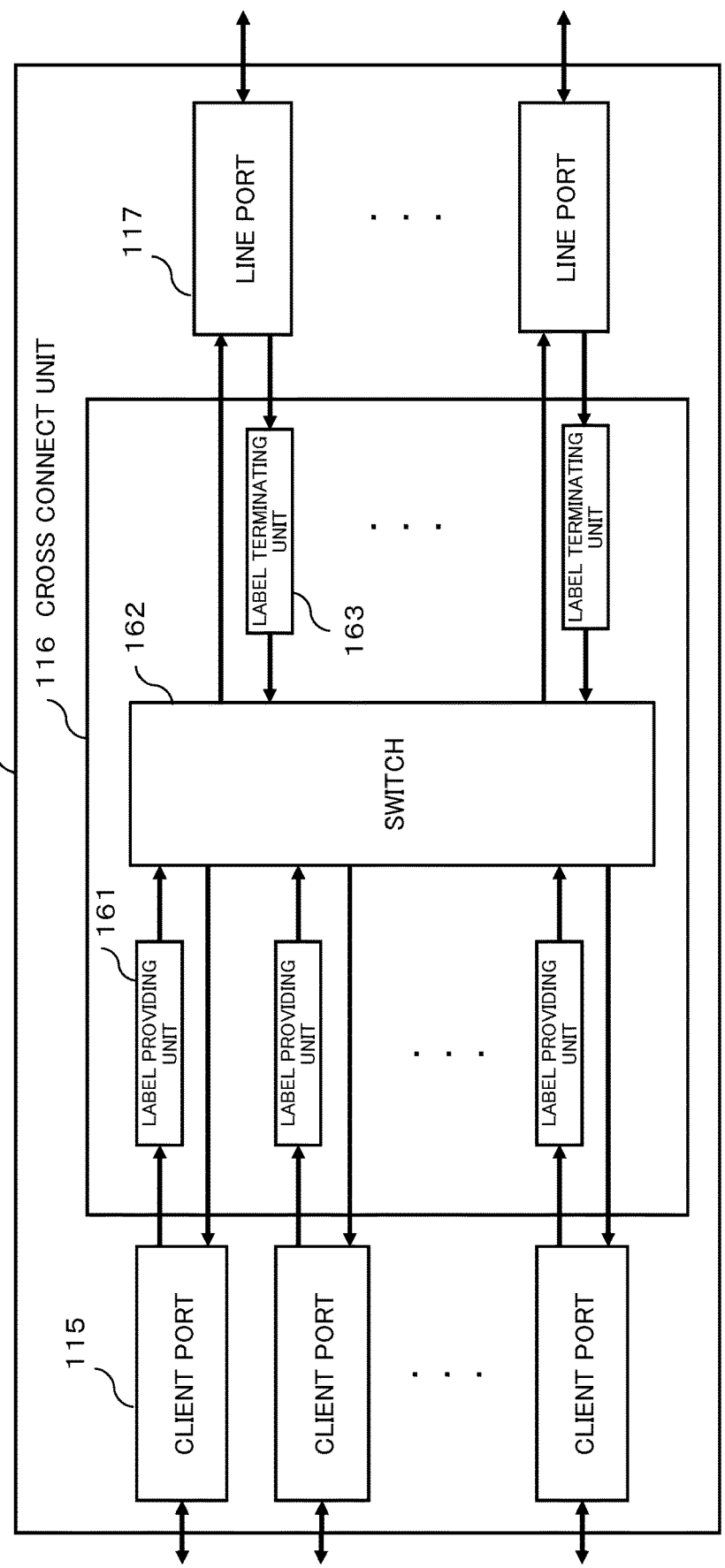
FIG. 2 is a diagram illustrating a configuration example of a transponder 110 according to the first example embodiment.

FIG. 2 is a diagram illustrating a configuration example of the transponder 110 according to the present example embodiment. The transponder 110 is a generic term of the transponders 111 to 11$n$ and 211 to 21$n$ illustrated in FIG. 1. The transponder 110 has a configuration and a function common to the transponders 111 to 11$n$ and 211 to 21$n$. In FIG. 2 and thereafter, an arrow appended between blocks indicates an example of a direction of a signal for description, and does not limit the direction of the signal.

The transponder 110 includes a client port 115, a cross connect unit 116, and a line port 117. The client port 115 is an interface of a client signal opposed to the end user device 13 or 23. The line port 117 is an interface of a line signal, opposed to the wavelength multiplexing unit 121 or 221. Each of the client port 115 and the line port 117 is provided in plural.

The cross connect unit 116 includes a label providing unit 161, a switch 162, and a label terminating unit 163. The label providing unit 161 provides a client signal to be transferred from any one of the client ports 115 to any one of the line ports 117 with a label for identifying a client port included in a transponder of a terminal station being a transmission destination of the client signal. The label terminating unit 163 extracts, from a label included in a client signal to be output from the line port 117 to the switch 162, information for identifying any one of the client ports 115 being a transmission destination of the client signal. The switch 162 connects a client port 115 being a transmission destination of a client signal, with a line port 117 that has received a line signal including the client signal, based on the information extracted by the label terminating unit 163. Each of the label providing unit 161 and the label terminating unit 163 plays a role of a label providing means or a label terminating means in the transponder 110.

A line signal to be transmitted and received to and from an outside of the transponder 110 by the line port 117 is an optical signal. Allowing each of the plurality of line ports 117 included in the terminal stations 11 and 21 to transmit and receive an optical signal having a different wavelength in the wavelength multiplexing unit 121 or 221 enables wavelength demultiplexing in the wavelength multiplexing unit 121 or 221. Inside the cross connect unit 116 according to the present example embodiment, a client signal is an electric signal. Therefore, the line port 117 performs conversion between a client signal (electric signal) and a line signal (optical signal). However, the client signal is not limited to an electric signal.

Figure 3:
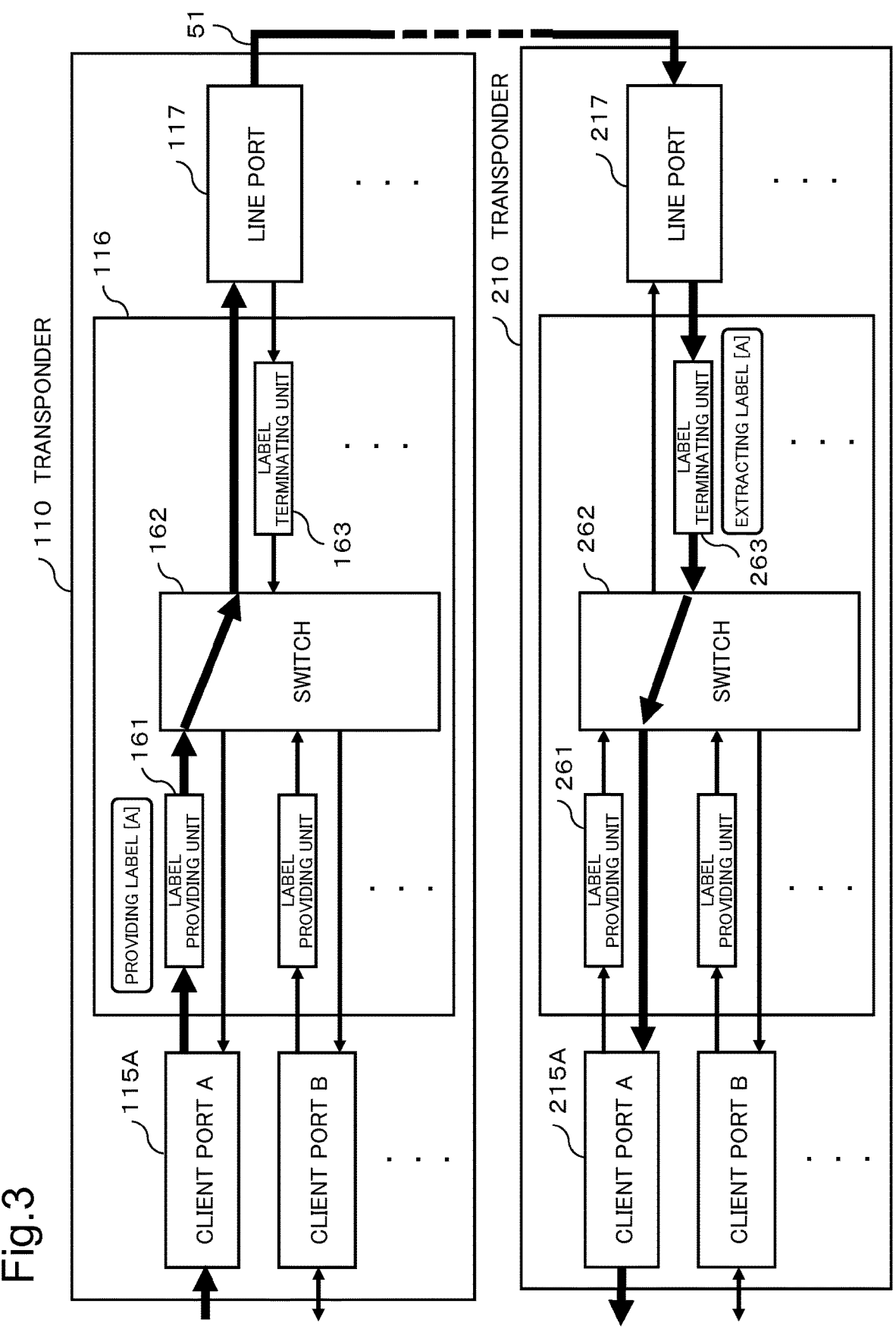
FIG. 3 is a diagram describing transmitting a client signal, when the transponder 110 is opposed.

FIG. 3 is a diagram describing transmission of a client signal, when the transponder 110 is opposed. In FIG. 3, a transmission source of the client signal is described as the transponder 110, and a transmission destination of the client signal is described as the transponder 210. In the following, description is made for a case where a client signal is transmitted from a client port A (115A) of the transponder 110 to a client port A (215A) of the transponder 210. A configuration and a function of the transponder 210 are similar to those of the transponder 110.

The client port A (115A) receives a client signal from the end user device 13 in FIG. 1. The client port A outputs the client signal to the label providing unit 161. The label providing unit 161 provides the client signal with a label. The label is information capable of uniquely identifying the client signal output by the client port A. For example, the label may be information automatically generated from a mounting position or a port administration number of the client port A. Alternatively, when the terminal stations 11 and 21 are configured in such a way that a blade is mounted on a chassis, a value generated from a mounting slot position of the blade on which a hardware of a client port is mounted, and a port administration number on the blade may be set as the label. This value is also a value capable of uniquely identifying the client port. The label may be wavelength information at the time of converting the client signal into a line signal, or an identifier for identifying an end user device being a transmission destination or a transmission source of the client signal. The label providing unit 161 outputs, to the switch 162, the client signal provided with the label. In the following, a label to be provided to a client signal to be transmitted from the client port A (115A) to the client port A (215A) is described as a "label A". A client signal provided with the label A is described as a "client signal A", and a line signal in which the client signal A is stored is described as a "line signal A".

The switch 162 outputs the client signal A to any one of the line ports 117. On the other hand, as described later, the transponder 210 that has received the client signal A transfers the client signal A to the client port A (215A), based on the label A provided to the client signal A. Therefore, in the optical transmission system 1, it is not necessary to administer a correspondence between the line port 117 on a transmission side where the client signal A is processed, and a line port 217 where the line signal A is received. Accordingly, the switch 162 is able to select the line port 117 freely for outputting the client signal A within a range allowable for a resource of the optical transmission system 1. The selected line port 117 converts the client signal A into the line signal A, and transmits the line signal A from the transponder 110 to the transponder 210.

The line signal A is received by the line port 217 of the transponder 210 via the optical transmission path 51. The transponders 110 and 210 may include a plurality of line ports 117 and 217, and store another client signal in an optical signal having a different wavelength for transmission. In this case, for example, as illustrated in FIG. 1, the wavelength multiplexing unit 121 is disposed between the transponder 110 and the optical transmission path 51, and the wavelength multiplexing unit 221 is disposed between the optical transmission path 51 and the transponder 210. By the wavelength multiplexing units 121 and 221, it is possible to transmit a WDM signal among the plurality of line ports 117 and 217. The WDM signal may include a line signal other than the line signal A in which the client signal A for connecting the client ports A (115A and 215A) is stored. The wavelength multiplexing units 121 and 221, and the optical transmission path 51 are configured in such a way that the line port 217 receives a line signal transmitted by the line port 117.

The line signal A transmitted from the client port A (115A) via the line port 117 and the optical transmission path 51 is received by the line port 217 of the transponder 210. The line port 217 converts the received line signal A into the client signal A, and outputs the client signal A to the label terminating unit 263.

The label terminating unit 263 extracts the label A provided to the client signal A, and outputs the client signal A and the label A to the switch 262. The switch 262 selects one of the ports for outputting the client signal A, based on the label A. For example, the switch 262 holds, in a table, information on a transmission destination of the client A included in the label A, and information on an output port of the switch 262, associated with the transmission destination, and selects an output port for outputting the client signal by referring to the table. When the label A is extracted in the label terminating unit 263, a transmission destination of the client signal A is the client port A (215A). Therefore, the switch 262 reads, from the table, a port connected to the client port A (215A) associated with the label A. Then, the switch 262 connects an input port with an output port of the switch 262 in such a way that the client signal A is output from the read port. As described above, information on a transmission destination of the client signal A is information for uniquely identifying the client signal A, and may be information capable of identifying a transmission destination of the client signal A, based on the information.

In this way, the transponder 110 provides a client signal with information (label) capable of uniquely identifying a client port being a transmission destination of the client signal. Then, the transponder 210 selects a client port for outputting the client signal, based on the label information. Therefore, it is not necessary to administer information on from which one of line ports of the transponder 110, a line signal is transmitted, and by which one of line ports of the transponder 210, the line signal is received. Specifically, in the optical transmission system 1, it is possible to transmit a client signal without being conscious of cross-connect information within the transponders 110 and 210, and it is possible to facilitate port administration in the cross connect unit 116 for inputting and outputting a client signal.

Both of the transponders 110 and 210 include the label providing unit 161 and the label terminating unit 163. Therefore, also when a client signal is transmitted from the transponder 210 to the transponder 110, a similar advantageous effect is acquired by an operation similar to the above.

Second Example Embodiment

Figure 4:
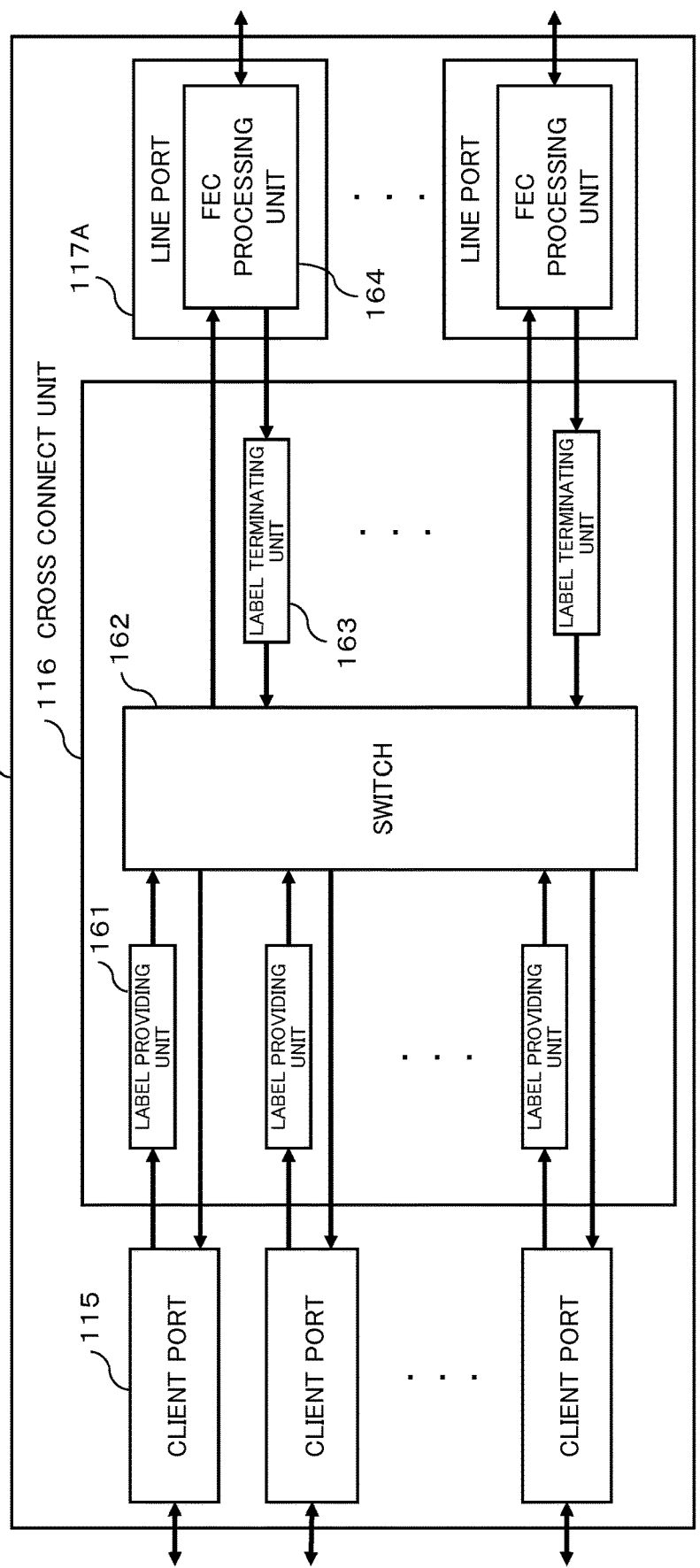
FIG. 4 is a diagram illustrating a configuration example of a transponder 110A according to a second example embodiment.

FIG. 4 is a diagram illustrating a configuration example of a transponder 110A according to a second example embodiment of the present invention. Compared to the transponder 110 according to the first example embodiment, the transponder 110A according to the present example embodiment includes a line port 117A, in place of the line port 117. The transponder 110A may be used as the transponder 110 in FIGS. 2 and 3 according to the first example embodiment.

The line port 117A includes an FEC processing unit 164, in addition to a function of the line port 117. The FEC processing unit 164 performs forward error correction (FEC) processing to a client signal passing through the line port 117A. Specifically, the FEC processing unit 164 performs error correction encoding processing to a client signal input from a switch 162, adds an error correction frame (FEC frame) to the client signal, and transmits the client signal, as a line signal. The FEC processing unit 164 performs error correction code decoding processing of a client signal converted from a received line signal.

At the time of transmitting a line signal, the FEC processing unit 164 inserts a label provided by a label providing unit 161 into a free area of an FEC frame of a client signal, and converts the client signal into a line signal. At the time of decoding an FEC frame of a client signal converted from a received line signal, the FEC processing unit 164 extracts a label inserted into a free area of the FEC frame, and outputs the label together with the client signal to the label terminating unit 163.

The transponder 110A according to the second example embodiment provides, in addition to an advantageous effect according to the first example embodiment, an advantageous effect that it is possible to suppress an increase in a size of a client signal and a line signal resulting from providing a label, by inserting the label into a free area of the FEC frame.

Third Example Embodiment

Figure 5:
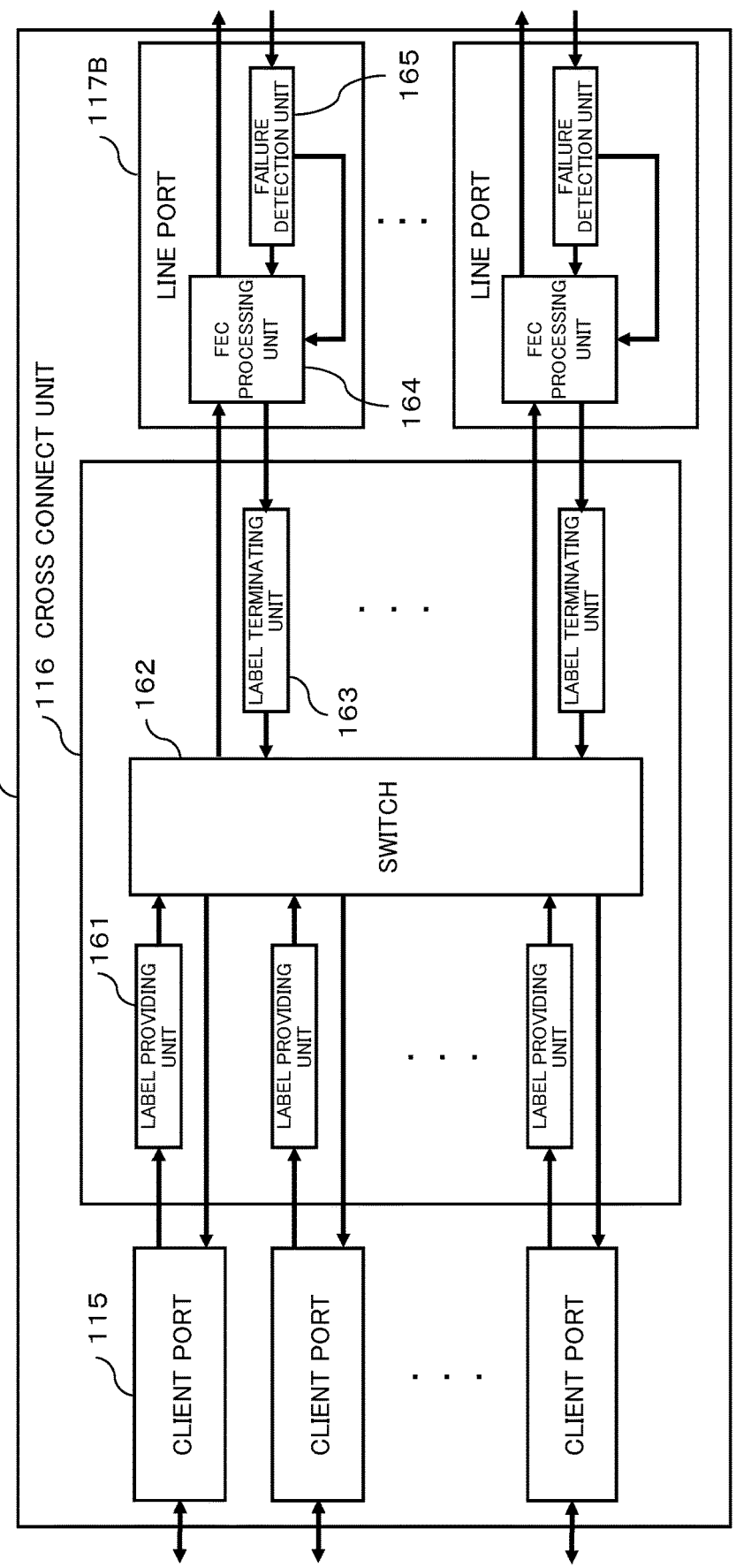
FIG. 5 is a diagram illustrating a configuration example of a transponder 110B according to a third example embodiment.

FIG. 5 is a diagram illustrating a configuration example of a transponder 110B according to a third example embodiment of the present invention. The transponder 110B according to the present example embodiment includes a line port 117B, in place of the line port 117A. The transponder 110B may be used as the transponder 110 in FIGS. 2 and 3 according to the first example embodiment.

The line port 117B includes a failure detection unit 165, in addition to an FEC processing unit 164. The FEC processing unit 164 included in the line port 117B applies processing to a client signal passing through the line port 117B similarly to the FEC processing unit 164 according to the second example embodiment.

The failure detection unit 165 generates information (failure information) indicating an anomaly at the time of detecting an anomaly of the line port 117B, and transmits the failure information to an opposing transponder (e.g., the transponder 210 in FIG. 3). Failure information may be generated not only at the time of failure of the line port 117B, but also when an anomaly is present in a line signal received from the optical transmission path 51 by the line port 117B, or in a client signal included in the line signal. The FEC processing unit 164 included in the line port 117B stores the failure information in a free area of an FEC frame, and transmits the failure information to an opposing transponder. The opposing transponder examines whether the failure information is stored in a free area of an FEC frame of a line signal received from the transponder 110B. When the failure information is stored, the opposing transponder eliminates, from a transmission destination of the line signal, a line port of the transponder 110B in which the failure information is detected. Then, the opposing transponder transmits the line signal to a line port other than the line port in which the failure information is detected. Therefore, also when the line port 117B of the transponder 110 fails, it is possible to suppress lowering of transmission quality of a line signal. Also, as compared with a case where an anomaly of a client signal is detected in an end user device, it is possible to discover a failure of the client signal at an earlier stage, and it is easy to specify a place where an anomaly occurs.

First Modification Example of Third Example Embodiment

In the transponder 110B illustrated in FIG. 5, a priority may be set for each of a plurality of client ports 115. At the time of transmitting failure information to an opposing transponder, the FEC processing unit 164 may also transmit a priority of each of the client ports 115 in the transponder 110B. Thus, the opposing transponder is able to allocate a line signal to a line port in such a way that communication with a client port 115 notified from the transponder 110B and having a high priority is prioritized, and transmit the line signal to the transponder 110B. Consequently, also when it is not possible to transmit and receive a client signal by using all line ports 117B due to a failure of any one of the line ports 117B in the transponder 110B, it becomes possible to protect a client signal having a high priority.

Second Modification Example of Third Example Embodiment

Figure 6:
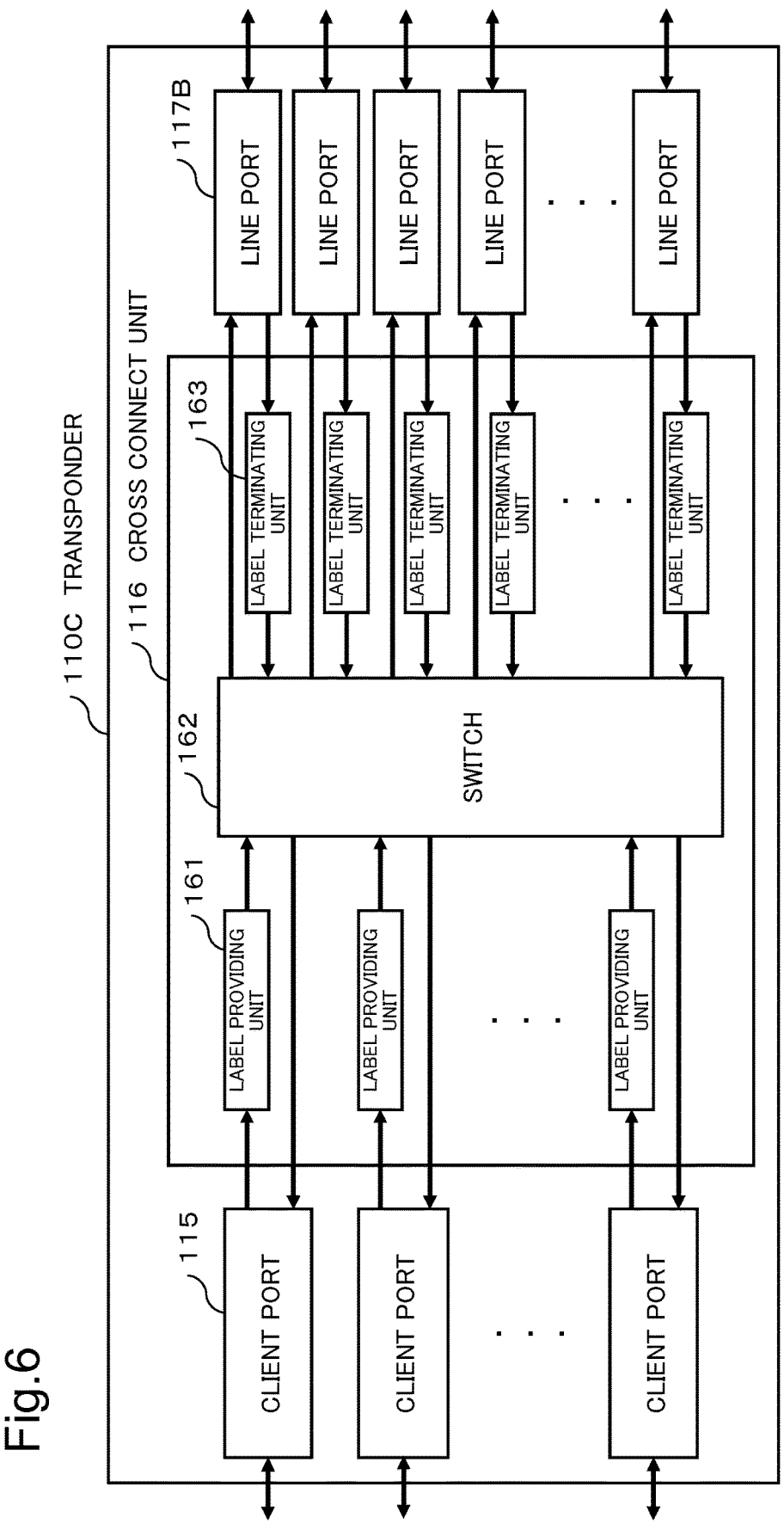
FIG. 6 is a diagram illustrating a configuration example of a transponder 110C.

FIG. 6 is a diagram illustrating a configuration example of a transponder 110C being a second modification example according to the third example embodiment. The transponder 110C includes a line port 117B having a failure detection unit 165 similarly to the transponder 110B. The transponder 110C achieves a redundancy switching function by making a total of transmission capacities of line ports 117B greater than a total of transmission capacities of client ports 115. For example, when a transmission capacity of one client port 115, and a transmission capacity of one line port 115B are the same, the number of the line ports 117B may be set greater than the number of the client ports 115. Thus, when a line port 117B has failed, it is possible to allow a redundant line port 117B to substitute the function of the line port 117B. Generally, setting a sum of transmission capacities of the line ports 117B greater than a sum of transmission capacities of the client ports 115 allows another line port 117B to process a part or the entirety of a client signal to be transmitted and received by the failed line port 117B. Switching the line port 117B in the transponder 110C, and allocating a capacity of a line signal to be transmitted to the line port 117B may be controlled, based on failure information by a transponder opposing to the transponder 110C.

Fourth Example Embodiment

Figure 7:
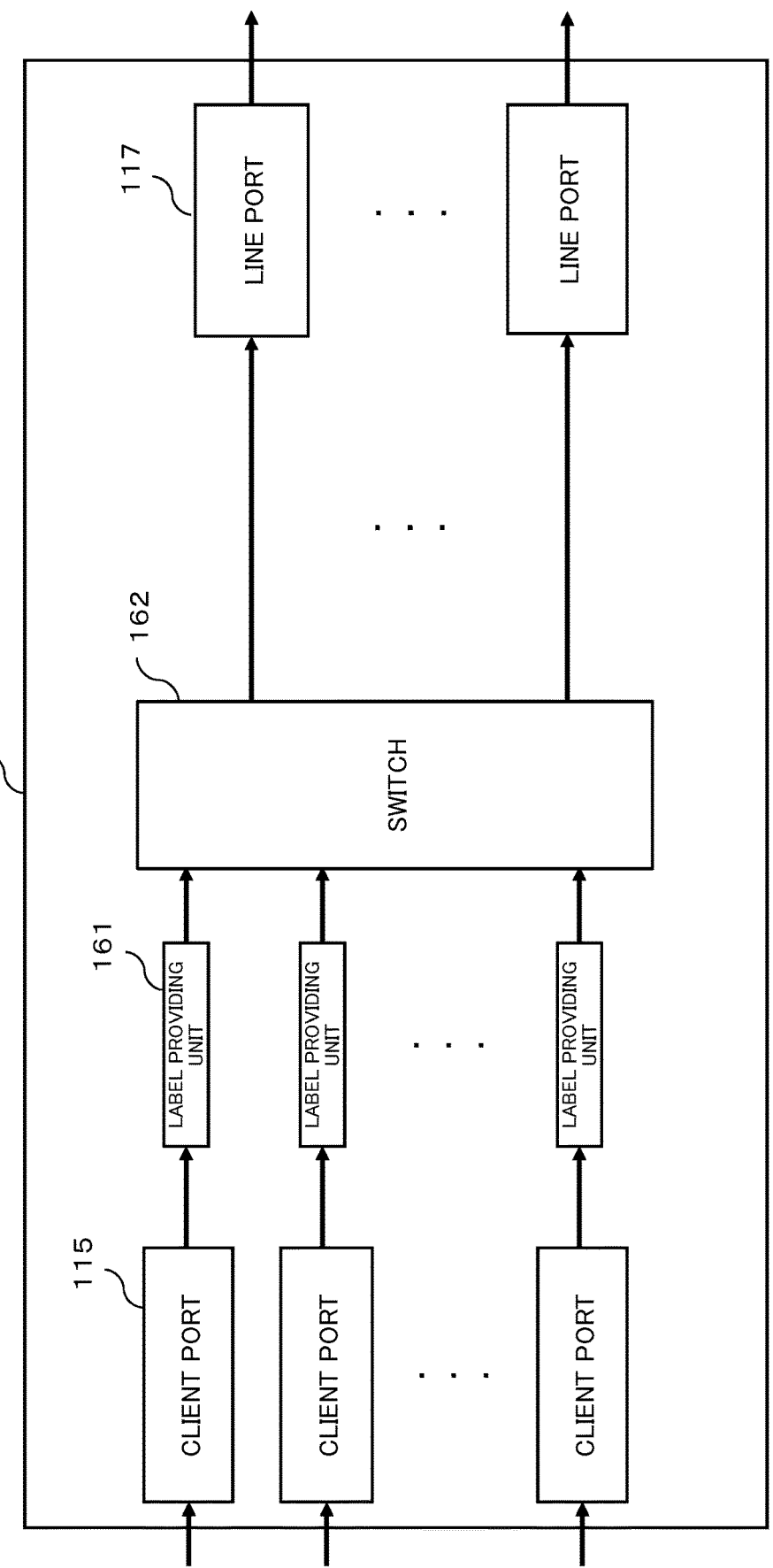
FIG. 7 is a diagram illustrating a configuration example of an optical transmitter 300 according to a fourth example embodiment.

FIG. 7 is a diagram illustrating a configuration example of an optical transmitter 300 according to a fourth example embodiment. According to the first example embodiment, a configuration in which a client signal is transmitted between the transponder 110 and the opposing transponder 210, and an advantageous effect thereof have been described. An advantageous effect to be acquired by the transponder 110 is also acquired by the following optical transmitter 300.

The optical transmitter 300 includes a client port 115, a label providing unit 161, a switch 162, and a line port 117. The label providing unit 161 provides a client signal to be transferred from any one of the client ports 115 to any one of the line ports 117 with a label for identifying a transmission destination of the client signal. The switch connects a client port 115 that has received a client signal from an end user device, and a line port 117 for transmitting the client signal. It is possible to employ the optical transmitter 300 as the transponder 110 in FIG. 3. Further, the optical transmitter 300 may employ the line port 117A illustrated in FIG. 4 or the line port 117B illustrated in FIG. 5, in place of the line port 117.

The optical transmitter 300 having a configuration as described above provides a client signal with a label for identifying a transmission destination of the client signal. Thus, a transponder being a transmission destination of a client signal is able to discriminate a port being an output destination of the client signal by label information, and select a port for transferring the client signal. Consequently, it is possible to transmit a client signal without being conscious of cross connect of any one of transponders being a transmission source and a transmission destination of the client signal. Specifically, the optical transmitter 300 is able to facilitate port administration in a cross-connect function of inputting and outputting a client signal.

Fifth Example Embodiment

Figure 8:
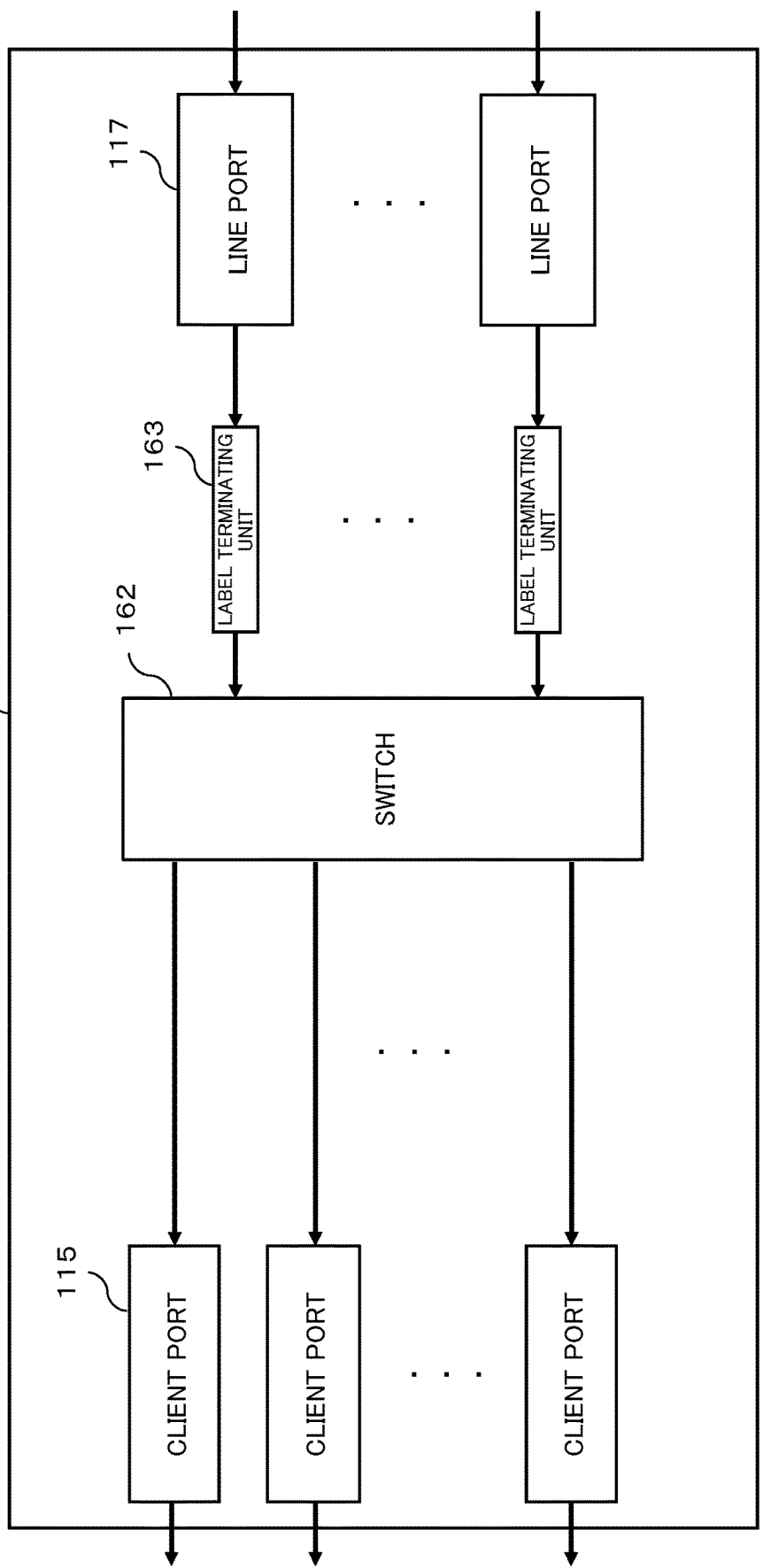
FIG. 8 is a diagram illustrating a configuration example of an optical receiver 400 according to a fifth example embodiment.
Figure 9:
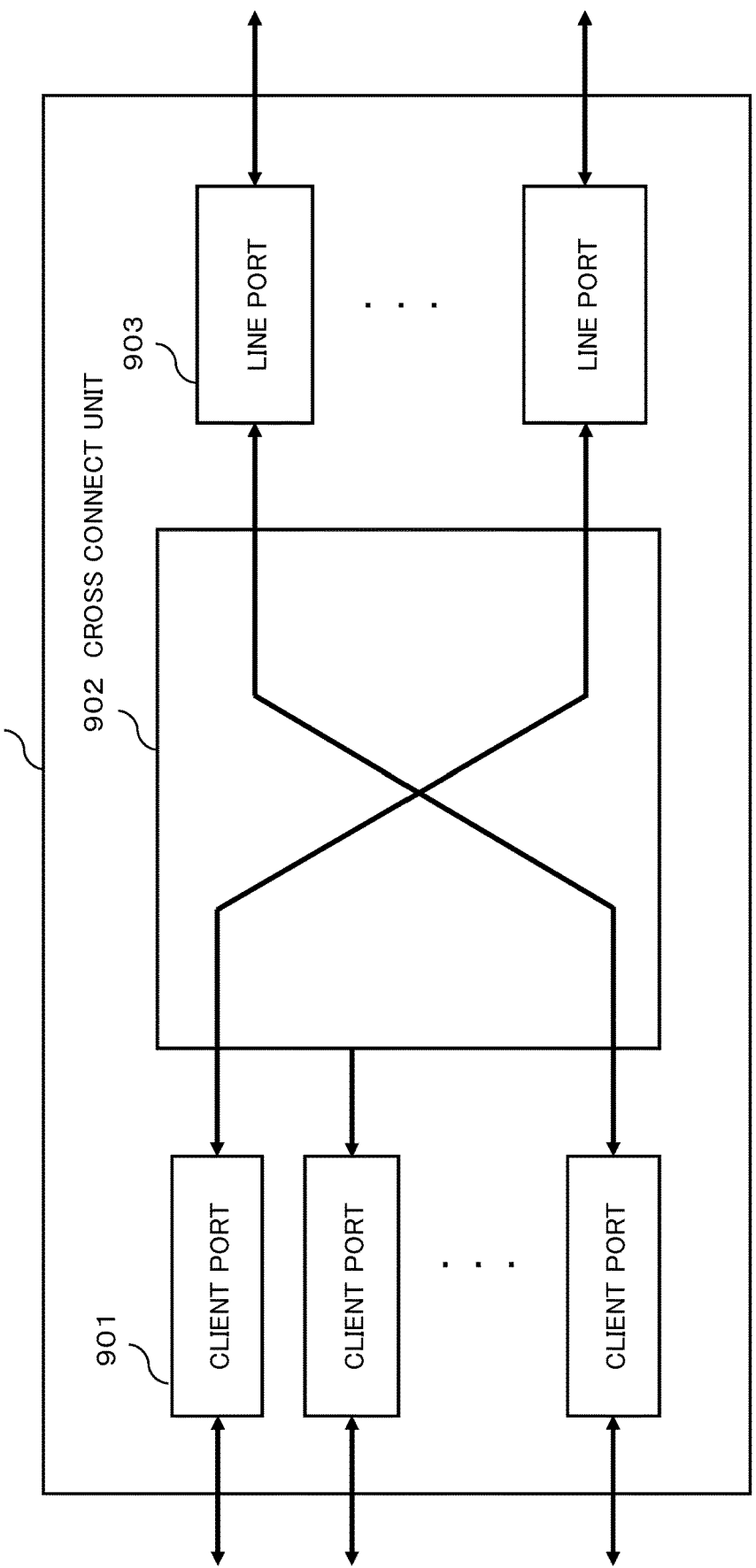
FIG. 9 is a diagram illustrating a configuration example of a transponder 900.

FIG. 8 is a diagram illustrating a configuration example of an optical receiver 400 according to a fifth example embodiment. An advantageous effect to be acquired by the transponder 210 according to the first example embodiment is also acquired by the following optical receiver 400.

The optical receiver 400 includes a client port 115, a switch 162, a label terminating unit 163, and a line port 117. The optical receiver 400 may be used in place of the transponder 210 in FIG. 3. The label terminating unit 163 extracts, from a label included in a line signal received by the line port 117, information for identifying a transmission destination of a client signal. The switch 162 connects, based on the information, the client port 115 being a transmission destination of a client signal, with the line port 117 that has received a line signal including the client signal.

The optical receiver 400 having a configuration as described above discriminates a port being an output destination of a client signal, based on information included in a label provided to the client signal by a transponder being a transmission source of the client signal. Then, the optical receiver 400 controls the switch 162 in such a way that the client signal is transferred to the port. Consequently, it is possible to transmit a client signal, without being conscious of cross connect of any one of transponders being a transmission source and a transmission destination of the client signal. Specifically, the optical receiver 400 is able to facilitate port administration in a cross-connect function of inputting and outputting a client signal.

It is also possible to configure the transponders 110, 110A, 110B, 110C, and 210 described in the first to third example embodiments, based on an optical transponder having both of a configuration of the optical transmitter 300 according to the fourth example embodiment, and a configuration of the optical receiver 400 according to the fifth example embodiment. The example embodiments of the present invention may also be described as the following supplementary notes, but are not limited to these supplementary notes.

(Supplementary Note 1)

An optical transmitter including:

a plurality of client ports for receiving a client signal from an end user device;

a plurality of line ports for generating a line signal in which the client signal is stored, and transmitting the line signal to an optical receiver;

a switch for connecting the plurality of client ports with the plurality of line ports; and a label providing means for providing the client signal with a label for identifying a transmission destination in the optical receiver.

(Supplementary Note 2)

The optical transmitter according to supplementary note 1, wherein each of the plurality of line ports includes a forward error correction processing means for performing error correction processing on the client signal, and storing the label in a free area of an error correction frame of the client signal.

(Supplementary Note 3)

The optical transmitter according to supplementary note 1 or 2, wherein the label providing means is disposed between any one of the plurality of client ports and the switch.

(Supplementary Note 4)

An optical receiver including:

a plurality of line ports for receiving a line signal in which a client signal is stored from an optical transmitter, and outputting the client signal;

a label terminating means for extracting, from a label included in the client signal, information for identifying a transmission destination of the client signal;

a switch for connecting any one of the plurality of client ports with any one of the plurality of line ports that receives the line signal, based on information for identifying a transmission destination of the client signal; and a plurality of client ports for transmitting the client signal to an end user device.

(Supplementary Note 5)

The optical receiver according to supplementary note 4, wherein each of the plurality of line ports includes a forward error correction processing means for performing error correction processing on the client signal, and extracting the label from an error correction frame of the line signal and outputting the label to the label terminating means.

(Supplementary Note 6)

The optical receiver according to supplementary note 4 or 5, wherein the label terminating means is disposed between any one of the plurality of line ports and the switch.

(Supplementary Note 7)

An optical transmission system configured in such a way that the optical transmitter according to any one of supplementary notes 1 to 3, and the optical receiver according to any one of supplementary notes 4 to 6 are opposed to each other and transmit the client signal.

(Supplementary Note 8)

An optical transponder including:

a plurality of client ports for transmitting and receiving a client signal between an end user device and the optical transponder;

a plurality of line ports for transmitting and receiving a line signal in which the client signal is stored to and from a communication device;

a label providing means for providing the client signal to be transmitted from the end user device to the communication device, with a first label for identifying a transmission destination in the communication device;

a label terminating means for extracting, from a second label included in the client signal received from the communication device, information for identifying a transmission destination of the client signal stored in the line signal received from the communication device; and a switch for connecting any one of the plurality of client ports with any one of the plurality of line ports that receives the line signal, based on information for identifying a transmission destination of the client signal.

(Supplementary Note 9)

The optical transponder according to supplementary note 8, wherein a sum of transmission capacities of the plurality of line ports is greater than a sum of transmission capacities of the plurality of client ports.

(Supplementary Note 10)

The optical transponder according to supplementary note 8 or 9, further including a wavelength multiplexing/demultiplexing means for wavelength-demultiplexing the line signal to be transmitted and received to and from the communication device at each of the plurality of line ports.

(Supplementary Note 11)

An optical transponder including a plurality of the optical transponders according to supplementary note 10, wherein the wavelength multiplexing/demultiplexing means further wavelength-demultiplexes the line signal to be transmitted and received to and from the communication device by each of a plurality of the optical transponders.

(Supplementary Note 12)

An optical transmission system configured in such a way that the optical transponder according to any one of supplementary notes 8 to 11, and the communication device including the optical transponder according to any one of supplementary notes 8 to 11 are communicably connected via an optical transmission path.

(Supplementary Note 13)

The optical transmission system according to supplementary note 12, wherein, when an anomaly is detected in any one of the plurality of line ports, a line port in which the anomaly is detected transmits information indicating that the anomaly is detected, to the communication device.

(Supplementary Note 14)

The optical transmission system according to supplementary note 13, wherein, when receiving information indicating that the anomaly is detected, the communication device suppresses transmission of the line signal to the line port in which the anomaly is detected.

(Supplementary Note 15)

The optical transmission system according to supplementary note 13 or 14, wherein information indicating that the anomaly is detected is stored in a free area of a forward error correction frame of the line signal.

(Supplementary Note 16)

The optical transmission system according to supplementary note 14 or 15, wherein the communication device preferentially transmits the client signal having a high priority being set associated with the first label of the client signal received from the optical transmission path via the line port other than a line port in which the anomaly is detected.

(Supplementary Note 17)

The optical transmission system according to supplementary note 16, wherein the priority is stored in a free area of a forward error correction frame of the line signal.

(Supplementary Note 18)

An optical transmission method including:

receiving a client signal from an end user device at a plurality of client ports;

transmitting a line signal in which the client signal is stored, to an optical receiver at a plurality of line ports;

connecting the plurality of client ports with the plurality of line ports; and providing the client signal to be transferred from any one of the plurality of client ports to any one of the plurality of line ports, with a label for identifying a transmission destination in the optical receiver.

(Supplementary Note 19)

An optical reception method including:

transmitting a client signal to an end user device at a plurality of client ports;

receiving a line signal in which the client signal from an optical transmitter is stored at a plurality of line ports;

extracting, from a label included in the client signal, information for identifying a transmission destination of the client signal; and connecting any one of the plurality of client ports with any one of the plurality of line ports that receives the line signal, based on information for identifying a transmission destination of the client signal.

(Supplementary Note 20)

An optical transmission and reception method including:

transmitting and receiving a client signal to and from an end user device at a plurality of client ports;

transmitting and receiving a line signal in which the client signal is stored to and from a communication device at a plurality of line ports;

providing the client signal to be transmitted from the end user device to the communication device, with a first label for identifying a transmission destination in the communication device;

extracting, from a second label included in the line signal received from the communication device, information for identifying a transmission destination of the client signal; and connecting any one of the plurality of client ports with any one of the plurality of line ports that receives the line signal, based on information for identifying a transmission destination of the client signal.

While the invention has been particularly shown and described with reference to example embodiments thereof, the invention is not limited to these embodiments. It will be understood by those of ordinary skill in the art that various changes in form and details may be made therein without departing from the spirt and scope of the present invention as defined by the claims. For example, each of the structure of the embodiments may be applied to other embodiments unless they conflict with each other. This application is based upon and claims the benefit of priority from Japanese patent application No. 2018-066355, filed on Mar. 30, 2018, the disclosure of which is incorporated herein in its entirety by reference.

REFERENCE SIGNS LIST

1 Optical transmission system
11, 21 Terminal station
110 to 11n, and 210 to 21n Transponder
110A to 110C Transponder
13, 23 End user device
211 to 21n Transponder
51 Optical transmission path
115 Client port
116 Cross connect unit
117, 117A, 117B, 217 Line port
121, 221 Wavelength multiplexing unit
161 Label providing unit
162, 262 Switch
163, 263 Label terminating unit
164 FEC processing unit
165 Failure detection unit
300 Optical transmitter
400 Optical receiver
900 Transponder
901 Client port
902 Cross connect unit
903 Line port

The invention claimed is:

1. An optical transmitter comprising:
a plurality of client ports configured to receive a client signal from an end user device;
a plurality of line ports configured to generate a line signal in which the client signal is stored, and transmit the line signal to an optical receiver;
a switch configured to connect the plurality of client ports with the plurality of line ports; and
a label provider configured to provide the client signal with a label for identifying a transmission destination in the optical receiver, wherein
each of the plurality of line ports includes a forward error correction processor configured to perform error correction processing on the client signal, and store the label in a free area of an error correction frame of the client signal.

2. The optical transmitter according to claim 1, wherein the label provider is disposed between any one of the plurality of client ports and the switch.

3. An optical receiver comprising:
a plurality of line ports configured to receive a line signal in which a client signal is stored from an optical transmitter, and output the client signal;
a label terminator configured to extract, from a label included in the client signal, information for identifying a transmission destination of the client signal;
a switch configured to connect any one of the plurality of client ports with any one of the plurality of line ports that receives the line signal, based on information for identifying a transmission destination of the client signal; and
a plurality of client ports configured to transmit the client signal to an end user device, wherein
each of the plurality of line ports includes a forward error correction processor configured to perform error correction processing on the client signal, extract the label from an error correction frame of the line signal, and output the label to the label terminator.

4. The optical receiver according to claim 3, wherein the label terminator is disposed between any one of the plurality of line ports and the switch.

5. An optical transmission system configured in such a way that the optical transmitter according to claim 1, and the optical receiver are opposed to each other and transmit the client signal, wherein
the optical receiver comprises:
a plurality of second line ports configured to receive the line signal in which the client signal is stored from the optical transmitter, and output the client signal;
a label terminator configured to extract, from the label included in the client signal, information for identifying the transmission destination of the client signal;
a plurality of second client points configured to transmit the client signal to a second end user device; and
a second switch configured to connect any one of the plurality of second client ports with any one of the plurality of second line ports that receives the line signal, based on the information for identifying the transmission destination of the client signal.

6. An optical transponder comprising:
a plurality of client ports configured to transmit and receive a client signal between an end user device and the optical transponder;
a plurality of line ports configured to transmit and receive a line signal in which the client signal is stored to and from a communication device;
a label provider configured to provide the client signal to be transmitted from the end user device to the communication device, with a first label for identifying a transmission destination in the communication device;
a label terminator configured to extract, from a second label included in the client signal received from the communication device, information for identifying a transmission destination of the client signal stored in the line signal received from the communication device; and
a switch configured to connect any one of the plurality of client ports with any one of the plurality of line ports that receives the line signal, based on the information for identifying the transmission destination of the client signal, wherein
each of the plurality of line ports includes a forward error correction processor configured to perform error correction processing on the client signal to be transmitted, and store the label in a free area of an error correction frame of the client signal to be transmitted.

7. The optical transponder according to claim 6, wherein a sum of transmission capacities of the plurality of line ports is greater than a sum of transmission capacities of the plurality of client ports.

8. The optical transponder according to claim 6, further comprising
a wavelength multiplexer/demultiplexer configured to wavelength-demultiplex the line signal to be transmitted and received to and from the communication device at each of the plurality of line ports.

9. An optical transponder comprising a plurality of the optical transponders according to claim 8, wherein
the wavelength multiplexer/demultiplexer further wavelength-demultiplexes the line signal to be transmitted and received to and from the communication device by each of the plurality of the optical transponders.

10. An optical transmission system configured in such a way that the optical transponder according to claim 6, and the communication device including the optical transponder according to claim 6 are communicably connected via an optical transmission path.

11. The optical transmission system according to claim 10, wherein,
when an anomaly is detected in any one of the plurality of line ports, the line port in which the anomaly is detected transmits information indicating that the anomaly is detected, to the communication device.

12. The optical transmission system according to claim 11, wherein,
when receiving information indicating that the anomaly is detected, the communication device suppresses transmission of the line signal to the line port in which the anomaly is detected.

13. The optical transmission system according to claim 11, wherein
information indicating that the anomaly is detected is stored in a free area of a forward error correction frame of the line signal.

14. The optical transmission system according to claim 12, wherein
the communication device preferentially transmits the client signal having a high priority being set associated with the first label of the client signal received from the optical transmission path via another any one of the plurality of line ports other than the line port in which the anomaly is detected.

15. The optical transmission system according to claim 14, wherein
the priority is stored in a free area of a forward error correction frame of the line signal.

16. An optical transmission method comprising:
receiving a client signal from an end user device at a plurality of client ports;
transmitting a line signal in which the client signal is stored, to an optical receiver at a plurality of line ports;
connecting the plurality of client ports with the plurality of line ports; and
providing the client signal to be transferred from any one of the plurality of client ports to any one of the plurality of line ports, with a label for identifying a transmission destination in the optical receiver, wherein
each of the plurality of line ports includes a forward error correction processor configured to perform error correction processing on the client signal, and store the label in a free area of an error correction frame of the client signal.

17. An optical reception method comprising:
transmitting a client signal to an end user device at a plurality of client ports;
receiving a line signal in which the client signal from an optical transmitter is stored at a plurality of line ports;
extracting, from a label included in the client signal, information for identifying a transmission destination of the client signal; and
connecting any one of the plurality of client ports with any one of the plurality of line ports that receives the line signal, based on information for identifying a transmission destination of the client signal, wherein
each of the plurality of line ports includes a forward error correction processor configured to perform error correction processing on the client signal, extract the label from an error correction frame of the line signal, and output the label to a label terminator.

18. An optical transmission and reception method comprising:
transmitting and receiving a client signal to and from an end user device at a plurality of client ports;
transmitting and receiving a line signal in which the client signal is stored to and from a communication device at a plurality of line ports;
providing the client signal to be transmitted from the end user device to the communication device, with a first label for identifying a transmission destination in the communication device;
extracting, from a second label included in the line signal received from the communication device, information for identifying a transmission destination of the client signal; and
connecting any one of the plurality of client ports with any one of the plurality of line ports that receives the line signal, based on information for identifying a transmission destination of the client signal, wherein
each of the plurality of line ports includes a forward error correction processor configured to perform error correction processing on the client signal to be transmitted, and store the label in a free area of an error correction frame of the client signal to be transmitted.

* * * * *